United States Patent Office 3,219,702
Patented Nov. 23, 1965

3,219,702
MANUFACTURE OF AROMATIC AMINES
BY AROMATIZATION
James E. Van Verth, Huntington, and Gene R. Wilder, St. Albans, W. Va., assignors to Monsanto Company, a corporation of Delaware
No Drawing. Filed Feb. 2, 1961, Ser. No. 86,600
19 Claims. (Cl. 260—571)

This invention relates to the preparation of aromatic amines from alicyclic ketones. More particularly, the invention relates to a method of forming compounds containing an aromatic radical linked to nitrogen employing alicyclic ketone as the source of the aromatic radical.

According to the process hereinafter described in detail, a radical from a hydrogen rich compound replaces hydrogen on nitrogen and loses hydrogen. The precursors or intermediates are probably similar to those formed during reductive alkylation with alicyclic ketones. These precursors are relatively unstable substances, often undistillable and easily hydrolyzed. Dehydrogenation normally requires severe conditions and particularly temperatures above the decomposition point of simple amine-ketone condensation products such as the anils. Surprisingly, it was found that at low hydrogen concentration dehydrogenation took place without significant decomposition. In other words, the temperature required for dehydrogenation was below decomposition temperature.

The invention provides a procedure for amino-dehydrogenation of alicyclic ketones. Fundamentally, the process involves heating below decomposition temperature ammonia compound having not more than two hydrogens of NH$_3$ replaced, hydrogen acceptor and six-membered alicyclic ketone with dehydrogenation catalyst. Ammonia compounds include NH$_3$ and substituted derivatives thereof which retain at least one hydrogen. Where only one hydrogen is available the process undoubtedly involves preliminary formation of the enamine. Where more than one hydrogen is available the cycloalkylideneamine probably forms, followed by reduction and aromatization, both resulting from hydrogen transfer reactions. Indeed, it is feasible and sometimes preferable to form cycloalkylideneamine as a preliminary independent step and then dehydrogenate by heating with catalyst and hydrogen acceptor. The temperature required for dehydrogenation is then usually about the same. Dehydrogenation still takes place without significant breaking of carbon-carbon bonds. Therefore, cycloalkylideneamine will be understood to be essentially equivalent to primary amine and alicyclic ketone. It should be noted that the hydrogen acceptor is exclusive of the radical dehydrogenated although it includes intramolecular hydrogen acceptor, as for example cyclohexylidene p-nitroaniline. If a molecule of cyclohexylideneaniline underwent dehydrogenation, other molecules of cyclohexylideneaniline could serve as hydrogen acceptors but in this specification and claims hydrogen acceptor means a different radical than the one dehydrogenated. In the process of reaction the nitrogen double bond in cyclohexylidene-aniline becomes a single bond and the alicyclic radical aromatizes through loss of hydrogen. The net result is that alicyclic ketone is converted to aromatic radical replacing hydrogen on ammonia compound initially charged. The course of reaction is obscure. The process evidently involves a complicated series of reactions and the invention is not limited to any theory or opinion as to the mechanisms by which the desired products form.

Aromatization requires alicyclic ketones containing six carbon atoms in the ring to which the keto radical is attached but substituents may be present in this ring and condensed ring compounds are suitable. Examples comprise cyclohexanone, 2-methylcyclohexanone, 3-methylcyclohexanone, 4-methylcyclohexanone, 3,4 - dimethylcyclohexanone, 2,4-dimethylcyclohexanone, 3,5-dimethylcyclohexanone, 2,5-dimethylcyclohexanone, 4-ethylcyclohexanone, 4-propylcyclohexanone, 4-isopropylcyclohexanone, 4-butylcyclohexanone, 4-tert-butylcyclohexanone, 2-ethylcyclohexanone, alpha-tetralone, beta-tetralone and 2-propylcyclohexanone. In addition to saturated ketones, unsaturated ketones are also useful as for example, carvenone, menthone and 3,5-dimethyl 2-cyclohexen-1-one. Ketones containing a quaternary carbon in the ring react poorly in the present process.

Any ammonia compound containing reactive hydrogen

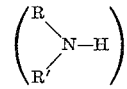

appears to undergo the desired aromatization reaction By way of illustration there may be mentioned aniline, toluidine, p-butylaniline, p-dodecylaniline, p-decylaniline, 3,4-dimethoxyaniline, p-alkoxyanilines, naphthylamine, methylamine, ethylamine, propylamine, isopropylamine, butylamine, sec-butylamine, tert.-butylamine, amylamine, cyclohexylaine, 2-ethylhexylamine, octylamine, sec.-octylamine, tert.-octylamine, decylamine, hexadecylamine, 2,3-xylidine, mesidine, 2-furanamine, xenylamine, benzylamine, phenethylamine, furfurylamine, ethylenediamine, purtrescine, cadaverine, p-phenylenediamine, 1,2-propanediamine, 1,3-propanediamine, 1,2-butanediamine and 1,4-naphthalenediamine. It will be noted that the foregoing include alkylamines of 1 to 16 carbon atoms and NH$_2$A where A is lower alkylene. Referring to substituted anilines by which is meant aniline substituted in the carboxylic ring, suitable substituents include cyclohexylamino, methylamino, ethylamino, butylamino, tert.-butylamino, octylamino, tert.-octylamino, dodecylamino, isopropylamino, 4-methylcyclohexylamino, 4-ethylcyclohexylamino, 4-propylcyclohexylamino, hydroxy, methoxy, ethoxy, butoxy, amyloxy, hexyloxy, heptyloxy, octyloxy, nonyloxy, decyloxy, dodecyloxy, phenoxy p-tolyloxy, o-tolyloxy, m-tolyloxy, methyl, ethyl, propyl, isopropyl, butyl, amyl, hexyl, heptyl, octyl, nonyl, decyl, dodecyl and hexadecyl radicals. Acyl and carbonyl substituents sometimes lead to mixtures of products although dehydrogenation took place smoothly with p-acetylaniline, p-aminobenzophenone and p-aminobenzoic acid. The halogens, except fluorine, are undesirable substituents because they enter into reaction. Chlorine, bromine and iodine but not fluorine are removed under the conditions of reaction and increase formation of tars.

Heating ammonia and cyclohexanone with palladium catalyst yields mixtures of aniline and diphenylamine, the ratio of which depends upon the hydrogen acceptor and reaction conditions. Secondary amines can be condensed to form tertiary amines. Secondary amines suitable as starting materials are exemplified by diphenylamine, N-ethylaniline, N-octylaniline, N-methylaniline, N-propylaniline, N-isopropylaniline, N-butylanilne, phenyl-beta-naphthylamine, N-cyclohexylaniline, diethylamine, dibutylamine, diamylamine, dioctylamine and dinonylamine. Heating N-methylaniline for 90 minutes at 153–162° C. with palladium on carbon catalyst in the presence of pinene as hydrogen acceptor produced N-methyldiphenylamine in admixture with N-cyclohexyl N-methylaniline. Water was evolved in theoretical quantity.

Many dehydrogenation catalysts are known and a variety are commercially available. In general, hydrogenation catalysts also function as dehydrogenation catalysts. Examples of dehydrogenation catalysts are rhodium, ruthenium, platinum, palladium, Raney nickel, Raney cobalt, copper chromite, iridium, osmium, oxides of chromium and oxides of molybdenum. For the purposes of the present invention palladium is much to be preferred, is effective under milder conditions and results in higher yields. It will be appreciated, however, that other dehydrogenation catalysts are contemplated and the desired products have been formed from reactions utilizing other catalyst systems, particularly other platinum metals. Desirably, the catalyst is supported on charcoal, asbestos, alumina, pumice, kieselguhr, silica gel or barium sulfate. The amount of catalyst charged, expressed as percent by weight of the final product expected from the reaction assuming theoretical yield, will depend upon the reaction rate required. Amounts within the range of 1–12% of 5% palladium on carbon have effectively catalyzed the reactions although these are not the absolute limits. The reactions may be effected in the presence of elemental hydrogen providing the hydrogen concentration is not so high as to make hydrogenation predominate over dehydrogenation. The presence of hydrogen gas sometimes helps maintain catalyst activity. The step of heating with the catalyst includes, of course, the technique of passing the reactants through fixed bed catalyst.

The hydrogen acceptor increases yields, gives purer products, permits optimum yields at lower temperatures than would otherwise be feasible and reduces by-products. For example, formation of phenol from cyclohexanone is practically nil. Presence of hydrogen acceptor reduces N-alicyclic amine content of the product. The reduced form disappears altogether in the presence of sufficient hydrogen acceptor. As hydrogen acceptor any of a wide variety of reducible materials may be used although it is desirable to select a material of low volatility at reaction temperature. As hydrogen acceptor there may be used benzylidene aniline or olefins, as for example dialkyl maleates, 1-octene, allylbenzene, indene, vinyl-acetic acid, crotonic acid, maleic acid and fumaric acid. Substances which polymerize readily are in general less efficient. The preferred hydrogen acceptors are nitrocompounds, as for example 2,6-dimethylnitrobenzene, m-tert.-butylnitrobenzene, p-amylnitrobenzene, p-hexylnitrobenzene, p-octylnitrobenzene, p-sec.-octylnitrobenzene, p-tert.-octylnitrobenzene, p-nonylnitrobenzene, p-decylnitrobenzene, p-ethoxynitrobenzene, o-ethoxynitrobenzene, 2,6-dimethyl-4-aminonitrobenzene, nitrobenzene, p-dinitrobenzene, m-dinitrobenzene, p-dodecylnitrobenzene, p-tert.-dodecylnitrobenzene, 4-nitrodiphenyl, p-phenoxynitrobenzene, p-cyclohexylnitrobenzene, p-benzylnitrobenzene, nitromethane, nitroethane, 2-nitropropane, 1-nitropropane, 1-nitronaphthalene, 2-, 3- and 4-nitrotoluene, 4-nitroanisole, p-ethylnitrobenzene, p-propylnitrobenzene, p-isopropylnitrobenzene, m-ethylnitrobenzene, 4-nitrobenzonitrile, p-nitroacetanilide, p-nitroformanilide, 2,4-dinitrotoluene, 4-nitrobenzoic acid, m-butylnitrobenzene, p-tert.-butylnitrobenzene and nitrocyclohexane. The term "nitrocompound" is used in its usual sense to mean an organic compound containing monovalent-$NO_2$ radical. The nitroalkanes include nitromethane, nitroethane, nitropropane and nitrobutane. Reduction of a nitroalkane to admixture of alkylamine and nitroalkane and condensation with cyclohexanone in presence of palladium catalyst provides a synthesis route to N-alkylanilines. Where it is desired to employ a nitrocompound which serves only as hydrogen acceptor, there may be selected one in which both ortho positions are occupied by alkyl radicals. The 2,6-dialkyl anilines react slowly with ketones and permit less hindered amines to undergo reaction preferentially. The ratio of nitrocompound should be sufficient to act as hydrogen acceptor for stoichiometric amounts of Schiff's base formed throughout the reaction. A minimum of ⅔ mole of nitrocompound per mole of ketone to be reacted is required in the case of cyclohexanone but if it is desired to propagate the reaction by using amine formed in situ to make further product, two moles of nitrocompound per mole of amine should be used together with ketone equal to the total moles of nitrocompound and amine. Operation with excess amine is also feasible and has advantage in some instances. It then becomes desirable to recover the excess amine employed in the initial charge as well as any which may be formed during the reaction. As pointed out above, initial condensation between the amine and ketone may be carried out before the remainder of the reaction. After forming Schiff's base by condensing ketone and primary amine there is added ⅔ mole of nitrocompound per mole of Schiff's base and the mixture heated over dehydrogenation catalyst.

The optimum temperature for heating will vary depending upon the reactants selected, catalyst and method of reaction. While heating will usually be within the range of 125–250° C. these are not the absolute operating limits. The reactions go at lower temperatures and may be conducted at higher temperatures below decomposition temperature. In general, reaction temperatures will not be above 300° C. As indicated above, dehydrogenation following preliminary formation of ketone-amine condensate generally is essentially equivalent to effecting the reactions simultaneously. For reactions employing nitrocompounds as hydrogen acceptor and palladium catalyst, temperatures within the range of 130–200° C. are satisfactory although the process has been carried out successfully at temperatures as low as 110° C. With platinum, reactions have been conducted at temperatures within the range of 220–250° C. Where the reactions are carried out simultaneously and by-product water forms, it is feasible to separate water from the reaction mixture during heating with the catalyst. This may be accomplished most conveniently by azeotropic distillation employing any of the well-known azeotroping agents. Solvents and mixtures of solvents may be incorporated in the reaction medium, as for example benzene, toluene, cymene, and excess of the cyclic ketone used as reactant. However, results may be better if the reaction is run in a closed system without azeotroping water. It appears that the driving force for the reaction is not elimination of water but reduction of nitrocompound by intermediate products.

The invention provides a general method for the preparation of aromatic amines. A general reaction for introducing a phenyl group into a primary amine employing nitrocompound as hydrogen acceptor may be represented by the following equation in which the R's represent the same or different organic radicals:

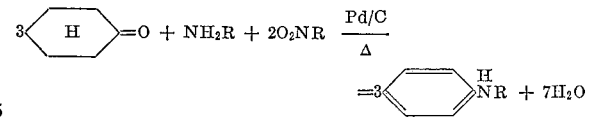

Where the R's are the same, the nitrocompound serves as both hydrogen acceptor and source of further quantities of the same amine. Two side reactions found to occur are reactions of cyclohexanone with secondary amines which are either initially present or formed during the reaction and dehydrogenation of cyclohexanone. However, the side reactions are slower than the main reaction.

Where the nitrocompound is precursor for the amine to be reacted, the nitrocompound and amine may, of course, be preformed and admixed in definite proportions but it is also feasible partially to reduce nitrocompound to provide a mixture containing the desired proportion of amine followed by condensation with cyclohexanone in the presence of dehydrogenation catalyst. As a matter of fact, nitrocompound may be reduced in the presence of cyclohexanone with hydrogen and hydrogenation catalyst. The reduction takes place preferentially to reduction of any Schiff's base which may be formed by condensation of the cyclohexanone and the resulting amine.

As exemplary of partial reduction, p-nitroaniline may be reduced ⅔ of the way to p-phenylenediamine over palladium catalyst supported on carbon. The resulting mixture treated with cyclohexanone and acetone between 150–200° C. gives N-isopropyl-N'-phenyl-p-phenylenediamine. Reducing p-nitro-N-isopropylaniline one-third by catalytic reduction followed by addition of cyclohexanone and heating gives N-isopropyl-N'-phenyl-p-phenylenediamine in more than 70% yield. Some catalysts are more reactive when partial hydrogenation in situ precedes dehydrogenation.

The introduction of two aryl groups into p-nitroaniline by condensing with cyclohexanone over palladium catalyst is a feasible route to diphenyl-p-phenylenediamine. This reaction is accompanied by formation of N-cyclohexyl-N'-phenyl-p-phenylenediamine and N,N'-dicyclohexyl-p-phenylenediamine. The constituents may be separated if desired although for some purposes the composite reaction product serves admirably. It is an efficient antioxidant for protection of natural and synthetic rubber and other substances which deteriorate by absorption of oxygen from the air. Condensation of the amino group in p-nitroaniline with cyclohexanone to form p-nitrodiphenylamine would leave a net excess of 4 hydrogen atoms per mole. Reduction of the nitro group requires 6 hydrogen atoms leaving a net deficiency of 2 hydrogen atoms. For each 2 moles of N,N'-diphenyl-p-phenylenediamine formed, 1 mole of N-cyclohexyl-N'-phenyl-p-phenylenediamine would be expected. Actually, a random distribution of N-phenyl and N-cyclohexyl groups takes place forming all 3 possible products. The observed amounts were 65±5% of N,N'-diphenyl-p-phenylenediamine, 25±5% of N-cyclohexyl-N'-phenyl-p-phenylenediamine and 10±5% of N,N'-dicyclohexyl-p-phenylenediamine. A ratio of 2 moles of p-nitroaniline, 1 mole of p-dinitrobenzene and 6 moles of cyclohexanone balances the hydrogen requirements for N,N'-diphenyl-p-phenylenediamine. This helps to keep by-products at a minimum.

In the condensation of n-nitroaniline and cyclohexanone the cyclohexanone concentration can vary. With 200% excess the reaction was completed easily at 163° C. With less cyclohexanone higher temperatures are desirable. For rapid reaction rate a minimum of about 1.5% of 5% palladium on carbon based on the product is desirable. It will be appreciated that p-nitroaniline in mixture with a different nitrocompound or different primary amine may be condensed with cyclohexanone to produce a variety of mixed products. For instance, heating 1 mole of p-nitroaniline, 1 mole of p-nitro-N-isopropylaniline and 3 moles of cyclohexanone with palladium catalyst at 140–200° C. produced N,N'-diphenyl-p-phenylenediamine in admixture with N-isopropyl-N'-phenyl-p-phenylenediamine.

Due to the difference in reaction rates between primary and secondary amino groups in the process, selective reaction is possible. A primary amine containing secondary or tertiary amino groups will undergo condensation and dehydrogenation, leaving the secondary or tertiary amino groups intact. Starting with N-ethyl-p-nitroacetanilide, reducing about one-third to N-ethyl-p-aminoacetanilide and heating the mixture with cyclohexanone and palladium catalyst yielded p-(N-ethylacetylamido)-diphenylamine in good yield. Similarly, N-acetyl-p-phenylenediamines or N-formyl-p-phenylenediamine heated with the corresponding nitrocompounds as hydrogen acceptor, palladium catalyst and cyclohexanone yielded p-acetamidodiphenylamine and p-formamidodiphenylamine respectively. In case of N-alkyl-p-phenylenediamines side reactions are less when the alkyl group is tertiary than when primary or secondary.

The following examples illustrate the invention in further detail.

Example 1

Into a glass or glass lined reactor was charged 75 grams (0.5 mole) of N-isopropyl-p-phenylenediamine, 90 grams (0.5 mole) of N-isopropyl-p-nitroaniline, 50 grams (0.51 mole) of cyclohexanone, 50 grams of xylene and 10 grams of 5% palladium supported on carbon. The reaction mixture was heated 44 minutes while distilling off water. At a temperature of 126° C. the first water was separated. The maximum temperature was 168° C., the temperature gradually rising as the reaction proceeded. A total of 20.4 ml. of water was separated as compared to 20.9 ml. calculated for the desired reaction. The reaction mixture was then transferred to a hydrogenator and hydrogenated at a maximum pressure of 400 pounds per square inch at 70° C. until the calculated quantity of hydrogen (0.5 mole) had been absorbed. The reaction mixture was then filtered and xylene removed by distillation (75° C. at 20 mm. Hg). The amine was then recovered from the residue by distillation through approximately a 12 inch column at 1.7 mm. Hg pressure. The maximum pot temperature was 185° C. and maximum head temperature 135° C. The distillate constituted 78 grams as compared to a calculated value of 75 grams. The residue had an open pan crystallizing point of 65° C. and weighed 102 grams. It contained 75% N-isopropyl-N'-phenyl-p-phenylenediamine and 15.3% of higher boiling products. This particular system minimizes consecutive reaction of cyclohexanone with product. Product assaying as high as 81% N-isopropyl-N'-phenyl-p-phenylenediamine and containing as low as 10.9% high boiling constituent has been obtained by the procedure of this example. It involves condensing three moles each of nitrocompound, amine and cyclohexanone to obtain three moles of product, two moles of amine and one of nitrocompound which latter is reduced to amine, the total amine recovered and recycled. Condensation of 2 moles of nitrocompound and 3 moles of preformed Schiff's base consumes all of the nitrocompound to produce 3 moles of product and 2 moles of amine but there is no advantage because the quality of product is poorer. The minimum practical temperature for condensing N-isopropyl-p-phenylenediamine and cyclohexanone in the presence of nitrocompound is around 120–130° C. but temperatures of 145–160° C. minimize other reactions and maintain reasonable reaction rates with economic catalyst levels.

Example 2

Into a glass or glass lined reactor was charged 22 grams (0.147 mole) of N-isopropyl-p-phenylenediamine, 55 grams (0.306 mole) of N-isopropyl-p-nitroaniline, 66 grams (0.67 mole) of cyclohexanone and 10 grams of 5% palladium supported on carbon. The reaction mixture was heated for 21 minutes while removing water by distillation. The first drop of water was obtained at 137° C. The maximum temperature was 178° C. There was obtained a total of 18.6 ml. of water as compared to a calculated value of 19.2 ml. The reaction mixture was then cooled, filtered and excess cyclohexanone removed by distillation. Final heating was pot temperature of 175° C. under 20 mm. Hg vacuum. The residue was then cast out on cold surface to obtain 100 grams of product assaying 70.1% N-isopropyl-N'-phenyl-p-phenylenediamine. The major by-product was N-cyclohexyl-N'-phenyl-p-phenylenediamine. Present in smaller amounts were N-cyclohexyl-N'-isopropyl-p-phenylenediamine, primary amine and N,N'-diphenyl-p-phenylenediamine. In this system excess cyclohexanone served as solvent for reaction of 2 moles of nitrocompound, 1 mole of amine and 3 of cyclohexanone to obtain 3 moles of product and 7 moles of byproduct water. More cyclohexanone extended reaction times and lowered the assay. The addition of xylene or other inert solvent did not alter the results significantly. Essentially equivalent results were obtained when preformed N-cyclohexylidene p-isopropylaminoaniline was substituted for the separate ingredients and when cyclohexanone was added over the course of the reaction but adding the nitrocompound over the course of the reaction reduced the yield.

Example 3

Into a glass or glass lined reactor was charged 55 grams (0.25 mole) of N-cyclohexyl-p-nitroaniline, 31 grams (0.163 mole) of N-cyclohexyl-p-phenylenediamine, 90 grams (0.9 mole) of cyclohexanone and 3 grams of 5% palladium supported on alumina. The reaction mixture was heated for 35 minutes at 148–192° C. while collecting 14 grams of water (calculated 16.2). There was obtained after filtering and heating under reduced pressure to distill any volatile by-products, 110 grams of good grade of N-cyclohexyl-N'-phenyl - p - phenylenediamine. The results were similar employing a reaction ratio of 55 grams N-cyclohexyl-p-nitroaniline, 23.8 grams of N-cyclohexyl-p-phenylenediamine, 50 grams of cyclohexanone and 2 grams of 5% palladium on carbon. The reaction mixture was heated for one hour at 142–220° C. while separating 17 grams of water. The N-cyclohexyl-N'-phenyl-p-phenylenediamine isolated as described weighed 107 grams.

Example 4

Into a glass or glass lined reactor was charged 4.75 grams (0.025 mole) of N-cyclohexyl-p-phenylenediamine, 11.01 grams (0.05 mole) of N-cyclohexyl-p-nitroaniline, 8.1 grams (0.083 mole) of cyclohexanone, 65 ml. of toluene and 2 grams of 5% palladium supported on carbon. The reaction mixture was heated to 115° C. at which temperature water began to collect in a water trap. Heating was continued for about an hour, maximum temperature being 196° C. Reaction mixture was allowed to cool and 50 ml. of cyclohexanone added and the mixture reheated to 140° C. and about 25 ml. of toluene added to adjust the B.P. to 135° C. An additional 3.3 ml. of water was collected over a period of about 90 minutes at 130–152° C. The reaction mixture was then cooled, filtered and volatile material removed by distillation to pot temperature of 180° C. under 14 mm. Hg pressure. The residue was cooled and upon seeding formed a mushy solid. Petroleum ether was added and the solid filtered, washed with petroleum ether and air dried. There was obtained in this manner 12.3 grams of N-cyclohexyl-N'-phenyl-p-phenylenediamine melting at 115–117.5° C.

Example 5

Into a glass or glass lined reactor was charged 4.75 grams (0.025 mole) of N-cyclohexyl-p-phenylenediamine, 11.01 grams (0.05 mole) of N-cyclohexyl-p-nitroaniline, 8 grams (0.28 mole) of cyclohexanone, 65 ml. of xylene and 2 grams of 5% palladium on carbon. The reactor was purged with nitrogen and then heated to 140° C. after which flow of nitrogen was discontinued. Heating continued for 223 minutes. The reaction mixture was then cooled, filtered and solvent removed from the filtrate by distillation at 52° C. under 13 mm. Hg pressure. To the residual crystalline material was added 50 ml. of heptane and after stirring thoroughly with the heptane the mixture was cooled in ice, filtered and washed with heptane. 16.3 grams (82%) of N-cyclohexyl-N'-phenyl-p-phenylenediamine was obtained, M.P. 116.9–117.7° C. The results were essentially the same when the 8 grams of cyclohexanone were replaced by 7.3 grams.

Example 6

This example illustrates the formation of the amine from nitrocompound by partial reduction followed by condensation of the resulting mixture as heretofore described. Into a suitable hydrogenator was charged 16.5 grams (0.075 mole) of N-cyclohexyl-p-nitroaniline, 8.0 grams (0.082 mole) of cyclohexanone, 50 ml. of xylene and 2 grams of 5% palladium supported on carbon. The mixture was treated with hydrogen until 0.075 mole had been absorbed and then transferred to a glass reactor together with 15 ml. of xylene. The reactor was purged with nitrogen and heated under a water trap. At 130° C. water began to separate. The reaction mixture was heated 2 hours and 45 minutes at 130 to 149° C., then filtered hot (105–110° C.) and the volatile constituents removed from the filtrate by heating to 52° C. under 13 mm. Hg. The residue was mixed with 50 ml. of heptane and the mixture cooled in ice, filtered and washed with heptane to obtain 16.3 grams (82% yield) of N-cyclohexyl-N'-phenyl-p-phenylenediamine, M.P. 117.6–118.6° C.

Example 7

Into a glass or glass lined reactor fitted with a water trap containing nitrobenzene was charged 19 grams (0.204 mole) of aniline, 62 grams (0.504 mole) of nitrobenzene, 58 grams (0.592 mole) of cyclohexanone and 5 grams of 5% palladium on carbon. The reaction mixture was heated under reduced pressure in order to control the boiling temperature. The temperature of the reaction mixture was kept at 155–175° C. while collecting 18–19 ml. of water over a period of about 4 hours. During most of this time the temperature was 165–175° C. The temperature was then raised to 170–180° C. for about 7 hours, additional water being collected. The total was 26 ml. The reaction mixture was then filtered, the filter washed with nitrobenzene and the combined filtrate and washings subjected to vapor phase chromatographic analysis from which it was determined that a 76% yield of diphenylamine had formed. There was no contamination with either N-cyclohexylideneaniline or N-cyclohexylaniline. A 75% yield of diphenylamine was obtained by using 5% excess nitrobenzene and heating in cymene 4 hours at 150–200° C. The reactor charge was 25.8 grams (0.21 mole) of nitrobenzene, 9.4 grams (0.101 mole) of aniline, 29.4 grams (0.3 mole) of cyclohexanone, 15 ml. of cymene and 5.1 grams of 5% palladium supported on carbon. Diphenylamine also formed, although in low yield, by heating cyclohexanone, aniline and nitrobenzene at 170–200° C. with 5% iridium on carbon, 5% osmium on carbon and 5% platinum on carbon respectively.

Example 8

Into a glass or glass lined reactor was charged 31 grams (0.33 mole) of aniline, 82 grams (0.66 mole) of nitrobenzene, 110 grams (1.1 mole) of cyclohexanone and 5 grams of 5% palladium supported on carbon. The reaction mixture was heated under a water trap, the first drop being collected at 144° C. Heating continued at 144–208° C. for 2 hours and 15 minutes, a total of 44 grams of water being collected. 40 grams of fresh cyclohexanone were added after about 30 minutes heating. The reaction mixture was then filtered and distilled, collecting a fraction boiling at 138–140° C. under 4 mm. Hg pressure. The yield was 138 grams or 81.5% of diphenylamine, M.P. 46–47° C. There was no depression of melting point with an authentic sample of diphenylamine.

Example 9

A mixture of 28 grams (0.3 mole) of aniline and 150 grams (1.5 mole) of cyclohexanone was heated in vacuo at 100–110° C. for 1½ hours while collecting 5.2 ml. of water. Cyclohexanone was then removed by distillation up to 125° C. pot temperature under 15 mm. Hg vacuum. There was then charged to a glass or glass-lined reactor 35.4 grams (0.204 mole) of cyclohexanone anil so prepared, 104 (0.46 mole) of dibutylmaleate and 3.4 grams of 5% palladium on carbon. The reaction mixture was heated under atmosphere of nitrogen at 155–165° C. for 4 hours, then cooled and filtered. The filtrate was subjected to vapor phase chromatographic analysis from which it was ascertained that a 70.6% yield of diphenylamine had formed.

Diphenylamine was formed, although in low yield, by heating 10.2 grams (0.059 mole) of cyclohexanone anil, 29.8 grams (0.13 mole) of dibutylmaleate and 1.0 gram of 5% platinum on carbon for 3 hours at 160±5° C. under an atmosphere of nitrogen. The yield was better when nitrobenzene was employed as the hydrogen acceptor. The charge was 10.2 grams (0.0590 mole) of cyclohexanone anil, 48 grams (0.039 mole) of nitrobenzene and 0.9 gram of 5% platinum on carbon. This charge was heated at 220–250° C. for about 2 hours to produce diphenylamine.

Example 10

Into a glass or glass-lined reactor was charged 14 grams (0.1 mole) of p-nitroaniline, 20 grams (0.2 mole) of cyclohexanone, 65 ml. of cymene and 3 grams of 5% palladium supported on carbon. The reaction mixture was heated under nitrogen atmosphere while by-product water was removed and collected in a trap. The total water collected was 6.7 ml. or 93% of the calculated amount after heating at refluxing temperature for 1 hour. The reaction mixture was then filtered hot and the filter rinsed with cymene. The filtrate crystallized immediately. Upon cooling, heptane was added to the crystalline material and the crystals separated by filtration. There was obtained 15 grams of N,N'-diphenyl-p-phenylenediamine, M.P. 140.5–144° C. A mixture with an authentic sample of N,N'-diphenyl-p-phenylene diamine, M.P. 144–149° C., melted at 141–149° C.

Example 11

Into a glass or glass-lined reactor was charged 70 grams (0.5 mole) of p-nitroaniline, 110 grams (1.1 moles) of cyclohexanone, 5 grams (0.046 mole) of p-phenylenediamine and 10 grams of 5% palladium on carbon. The reaction mixture was heated to 150° C. at which point water began to distill off. Heating was continued for about 38 minutes, temperature gradually rising to 196° C. in 24 minutes at which point 100 grams of cyclohexanone was added. The temperature at the end of the heating period was 179° C. at which time 45 grams of water had been collected. The reaction mixture was cooled to 150° C. and filtered into 300 grams of heptane, cooled and the solid product separated by filtration. The filter cake was washed with petroleum ether to obtain, after drying, 82 grams of N,N'-di-phenyl-p-phenylenediamine, M.P. 142–148° C. It was a light colored crystalline product. Another 26 grams was recovered from the mother liquor. The second crop was dark in color.

Examples 12, 13, 14 and 15

A series of experiments were carried out by heating 69 grams of p-nitroaniline with cyclohexanone and palladium supported on carbon in a glass reactor equipped with stirrer, thermometer, water trap and condenser. The reaction mixture was heated at refluxing temperature until slightly more than the calculated amount of water had been collected. The catalyst was removed by filtration of the hot reaction mixture through a steam heated funnel and the filtrate stripped of volatile constituents by heating first to 150° C. at 125 mm. Hg and finally to 170° C. at 15 mm. Hg. The hot residue was allowed to cool, solidify and subjected to u.v. analysis. The major proportion of the product was N,N'-diphenyl-p-phenylenediamine designated A in the table together with B, N-cyclohexyl-N'-phenyl-p-phenylenediamine and small amounts of C, N,N'-dicyclohexyl-p-phenylenediamine. The results are summarized in tabular form below:

Example 16

Into a glass or glass-lined reactor was charged 21 grams (0.113 mole) of 4-aminodiphenylether, 48.6 grams (0.226 mole) of 4-nitrodiphenylether, 60 grams (0.6 mole) of cyclohexanone and 5 grams of 5% palladium supported on carbon. The reaction mixture was heated 25 minutes at 145–186° C. during which time by-product water was collected and removed from the reaction mixture. The catalyst was removed by filtering the reaction product into 200 grams of cold heptane. The solids were removed from heptane by filtration, washed with heptane and dried to obtain 59 grams or 67% yield of p-phenoxy-diphenylamine, M.P. 100–101° C.

Example 17

Into a glass or glass-lined reactor was charged 64 grams (0.286 mole) of p-(2-ethylbutoxy)nitrobenzene and 30 grams (0.143 mole) of p-(2-ethylbutoxy)aniline and 100 ml. (1 mole) of cyclohexanone together with 5 grams of 5% palladium supported on carbon. The reaction mixture was heated at 150–171° C. for about 1 hour while collecting 18.5 grams of water. Low boiling constituents were removed by distillation and the product isolated by distillation in vacuo, collecting the fraction boiling at 215–217° C. at 4.5 mm. Hg. There was obtained 80 grams or 69.6% yield of p-(2-ethylbutoxy)diphenylamine.

Example 18

Into a glass or glass-lined reactor was charged 27.7 grams (0.125 mole) of N-cyclohexyl-p-nitroaniline, 16.9 grams (0.089 mole) of N-cyclohexyl-p-phenylenediamine and 50 grams of p-methylcyclohexanone together with 5 grams of 5% palladium on carbon. The reaction mixture was heated at 167–188° C. for 1 hour while collecting 4.7 ml. of water. The catalyst was removed by filtration and product recrystallized from heptane to yield 13 grams of N-cyclohexyl-N'-p-tolyl-p-phenylenediamine, M.P. 94–96° C.

Example 19

Into a glass or glass-lined reactor was charged 50.2 grams (0.2 mole) of p-octyloxy-nitrobenzene, 22.1 grams (0.1 mole) of p-octyloxy aniline and 70 ml. (0.7 mole) of cyclohexanone together with 5 grams of 5% palladium on carbon. The reaction mixture was heated at 155–183° C. for 1 hour while removing by-product water. The catalyst was removed by filtration and excess cyclohexanone removed by distillation in vacuo. The residue was then distilled collecting the fraction boiling at 235–237° C. at 3.5 mm. Hg pressure. There was obtained 67 grams of p-octyloxy diphenylamine, M.P. 41–43° C.

Example 20

Into a glass or glass-lined reactor was charged 23 grams of p-nitroaniline, 147 grams of cyclohexanone, 36 grams of p-phenylenediamine and 3.9 grams of 5% palladium on carbon. The charge was heated at 120–210° C. for 56 minutes. The catalyst was removed by filtration of the hot reaction mixture and filtrate stripped of volatile constituents. The product melted at 90–110° C. and comprised 25.5% N,N'-diphenyl-p-phenylenediamine, 49.6% N-cyclohexyl-N'-phenyl-p-phenylenediamine and 24.5% N,N'-dicyclohexyl-p-phenylenediamine.

Example 21

N-(4-ethoxyphenyl)-N'-phenyl-p-phenylenediamine was

| Example No. | Cyclohexanone, grams | 5% palladium on carbon, grams | Temperature of heating, °C. | Time of reaction, Mins. | Weight of product, grams | U.V. analysis, percent | | |
|---|---|---|---|---|---|---|---|---|
| | | | | | | A | B | C |
| 12 | 147.2 | 3.9 | 162–208 | 121 | 135 | 61.9 | 26.5 | 7.6 |
| 13 | 196 | 3.9 | 156.5–173.5 | 85 | 129 | 66.0 | 27.7 | 3.9 |
| 14 | 196 | 2.6 | 155.5–170.5 | 143 | 128 | 67.4 | 24.9 | 3.3 |
| 15 | 294 | 3.9 | 154.4–163 | 84 | 134 | 66.0 | 26.4 | 5.9 | prepared as follows: A mixture of 18.6 grams (0.075 mole) of 4-ethoxy-4-nitrodiphenylamine, 2.0 grams of 5% palladium supported on carbon and 50 ml. of cymene were charged to a Parr hydrogenator. About ⅓ of the hydrogen required for reduction of the nitro-compound was absorbed. The charge was then transferred to a flask, 8.0 grams of cyclohexanone and 15 ml. of cymene added, a water trap attached and the reaction mixture heated under a stream of nitrogen. Water began to collect in the trap when the temperature reached 163° C. Heating was continued at 173–179° C. for about an hour while collecting about 3.6 ml. of water. The reaction mixture was cooled to about 130° C., filtered, the filtrate cooled and diluted with 50 ml. of heptane. The crystals which separated upon dilution with heptane were removed by filtration, washed with a little fresh heptane and air dried to obtain 15.3 grams of the desired product as blue-gray crystals, M.P. 117.5–118° C. After recrystallization from a mixture of heptane and benzene the product melted at 117.8–118–4° C. It contained 9.4% nitrogen as compared to 9.2 nitrogen calculated for $C_{20}H_{20}N_2O$.

*Example 22*

N-cyclohexyl-N' - (1-naphthyl) - p-phenylenediamine was produced as follows: A mixture of 22.0 grams (0.010 mole) of N-cyclohexyl-p-nitroaniline, 3 grams of 5% palladium supported on carbon and 50 ml. of xylene were charged to a hydrogenator. The nitrocompound was partially reduced to amine by absorbing about ⅔ of the hydrogen theoretically required for reduction of all the nitrocompound to amine. The reaction mixture was then transferred to a flask, 16.1 grams (0.11 mole) of alpha-tetralone and 22 ml. of xylene added and heated under a Dean Stark trap. Water began to collect in the trap when the temperature reached 145° C. Heating was continued at 145–153° C. for about 5 hours while collecting 5.3 ml. of water. During the reaction 10 ml. of alpha-tetralone was added. The reaction mixture was then returned to the hydrogenator and reducible material remaining hydrogenated. The hydrogenated reaction mixture was filtered and volatile material removed by distillation to a pot temperature of 220° C. at 10 mm. Hg pressure. Heptane was added to the residue which resulted in separation of solids. The solids were filtered, washed with a heptane-xylene mixture and dried to obtain 9 grams of N-cyclohexyl-N'-(1-naphthyl)-p-phenylenediamine melting at 117.5–120° C. After recrystallizing from heptane it melted at 120–121° C. It contained 8.9% nitrogen which is the calculated value for $C_{24}H_{24}N_2$.

*Example 23*

A mixture of 20 grams (0.033 mole) of nitromethane, 3.6 grams (0.037 mole) of cyclohexanone, 2.0 grams of 5% palladium on carbon and 50 ml. of cymene were charged to a hydrogenator and hydrogenated at a pressure of 50 pounds per square inch. After about 0.07 mole of $H_2$ were absorbed the reduction was terminated, 4.1 grams (0.067 mole) of nitromethane, 7.2 grams (0.073 mole) of cyclohexanone and 25 ml. of cymene were added and the mixture heated while collecting by-product water. Water began to separate at 168° C. A total of about 2 ml. was collected after heating at 168–175° C. over a period of about 1½ hours. The reaction mixture was filtered to separate the catalyst, the filter washed with a little benzene and the filtrate and washings analyzed by gas liquid partition chromatography. It was ascertained that N-methylaniline had formed in a yield of about 6%.

*Example 24*

Phenyl-alpha-naphthylamine was produced from alpha-tetralone and nitrobenzene as follows: A mixture of 12.3 grams (0.100 mole) of nitrobenzene, 50 ml. of p-cymene and 2.0 grams of 5% palladium on carbon was partially hydrogenated in a Parr shaker hydrogenator. The initial hydrogen pressure was 50 pounds per square inch and the reaction was terminated when a pressure drop of 15 pounds per square inch had been obtained. The total pressure drop at the point of termination correspond to absorption of about 0.2 mole of $H_2$. The reaction mixture was then transferred to a flask, 16.1 grams (0.11 mole) of alpha-tetralone, 15 ml. of cymene added and heated under nitrogen while collecting by-product water. Water began to separate when the temperature reached about 147° C. After heating at 183–187° C. for 6 hours, 4.2 ml. of water was collected. 2 grams of an acidic clay was added after 2 ml. of water had been collected. Volatile material was then removed by distillation to a pot temperature of 100–105° C. at 17 mm. Hg pressure. The red oil remaining as a residue was dissolved in methyl alcohol, a little water added to cause oiling, cooled in ice and seeded. The crystals which precipitated were removed by filtration and washed with a 10:1 mixture of alcohol and water. The product melted at 53–56° C. After further purification and recrystallization from heptane the product melted at 58.4–59.5° C. The melting point was undepressed after mixture with an authentic sample of phenyl-alpha-naphthylamine.

*Example 25*

The Parr hydrogenator was charged with 13.9 grams (0.10 mole) of p-nitrophenol, 50 ml. of cyclohexanone and 2 grams of 5% palladium on carbon. Hydrogenation was terminated after 0.1 mole of $H_2$ had been absorbed and the reaction mixture transferred to a flask, 15 ml. of cyclohexanone added and after purging with nitrogen the reaction mixture was heated while collecting by-product water. Water began to separate at about 131° C. and heating was continued for about 44 minutes over which period the temperature gradually rose to 170.5° C. and 5.6 ml. of water were collected. The reaction mixture was cooled to about 60° C., catalyst removed by filtration and volatile constituents removed by distillation. To the residue was added 100 ml. of carbontetrachloride. The carbontetrachloride solution was cooled in ice and seeded with a few crystals of 4-anilinophenol. The crystalline solid which precipitated was removed by filtration and washed with a little cold carbontetrachloride to obtain 6.6 grams of 4-anilinophenol as a nearly white solid, melting point 65–67° C.

*Example 26*

A mixture of 22.8 grams (0.167 mole) of p-phenetidine, 55.7 grams (0.333 mole) of p-nitrophenetole, 100 grams of cyclohexanone and 10 grams of 5% palladium supported on carbon was charged to a reaction vessel and heated while collecting by-product water. 21 ml. of water was collected while the temperature gradually rose from 103 to 183° C. over a period of about 1 hour. The reaction mixture was then cooled, filtered and stripped of cyclohexanone. About 50 grams of heptane were added and the heptane solution washed with dilute sodium hydroxide. The product had limited solubility in heptane and removal of any phenol by the sodium hydroxide wash resulted in separation of crystals. The solids were removed by filtration, recrystallized twice from heptane and washed with cold petroleum ether to obtain 51 grams of p-ethoxydiphenylamine, melting point 71–72° C.

*Example 27*

A glass reaction vessel fitted with a condenser and water trap was charged with 122 grams (0.5 mole) of isobornyloxy aniline, 110 grams (1.1 moles) of cyclohexanone, 10 grams of 5% palladium supported on carbon and 65 grams of 2,6-dimethylnitrobenzene. The mixture was gradually heated while collecting by-product water. When the temperature reached 152° C., 5 ml. of water had been collected and after continuing the heating for about 20 minutes a total of 21.5 ml. of water was collected. The maximum temperature was 187° C. The reaction mixture was then cooled, filtered and the filtrate distilled in vacuo. Low boiling components were removed by distillation at 165° C. at 10 mm. Hg pressure and 135 grams of product fraction collected at 245–247° C. at 2.5 mm. Hg. The product was then recrystallized from acetic acid and methyl alcohol to obtain 97 grams of 4-isobornyloxy diphenylamine, M.P. 84–85° C.

*Example 28*

The reaction vessel fitted with a reflux condenser and water trap was charged with 41.0 grams (0.333 mole) of o-anisidine, 102.0 grams (0.667 mole) of o-nitroanisole, 150 grams (1.5 moles) of cyclohexanone and 10 grams of 5% palladium supported on carbon. The reaction mixture was heated for 1½ hours at a temperature of 160–194° C. while collecting 42 ml. of water. The reaction mixture was then cooled, filtered and excess cyclohexanone removed from the filtrate by distillation. The product was then distilled in vacuo. It boiled at 158–160° C. at 2 mm. Hg. There was obtained 115 grams of 2-methoxydiphenylamine.

*Example 29*

A glass reactor fitted with a condenser and water trap was charged with 18 grams (⅙ mole) of p-toluidine, 46 grams (⅓ mole) of p-nitrotoluene, 80 grams (0.8 mole) of cyclohexanone and 5 grams of 5% palladium on carbon. The charge was heated 4 hours while the temperature gradually rose from 142 to 186° C. Over this period 21.5 ml. of water was collected. The reaction mixture was cooled and cyclohexanone removed by distillation in vacuo. The product distilled at 193–197° C. at 3 mm. Hg. There was obtained 55 grams of 4-methyldiphenylamine. After recrystallizing from petroleum ether the product melted at 87–88° C.

*Example 30*

A one liter autoclave equipped with a stirrer was charged with 35 grams (0.233 mole) of N-isopropyl-p-phenylenediamine, 106 grams (0.589 mole) of N-isopropyl-p-nitroaniline, 132 grams (1.350 moles) of cyclohexanone, 8 grams of 5% palladium supported on carbon and 30 grams of water. The charge was heated for 2½ hours at 150–155° C. at which time the color of the nitrocompound had disappeared. The mixture was cooled, filtered and low boiling constituents removed from the filtrate by distillation to 180° C. at 10 mm. Hg. The residue was cast on a cold surface. The yield was 185 grams of solid having a crystallizing point of 63° C. Analysis for the content of N-isopropyl-N'-phenyl-p-phenylenediamine gave 76.5%.

In general, yields of product were approximately 100% and assays within the range of 70–80% using catalyst levels of 1.5–5.0 Pd/C. Amounts of phenol produced were very small and the cyclohexanone recovered was relatively pure. While presence of by-product water inhibited reaction of secondary amine with cyclohexanone, deliberate addition of water prior to condensation had no effect. Charging water was neither beneficial nor harmful. Addition of isopropanol to homogenize the reaction mixture gave equivalent results. It was found that acetone could be added at the end of the reaction to reductively alkylate any 4-aminodiphenylamine produced as well as any other primary amine present in the system.

*Example 31*

A 250 ml. round bottom 3-necked flask fitted with stirrer, thermometer, water trap and condenser was charged with 32.1 grams (0.15 mole) of 4-nitrodiphenylamine, 20.7 grams (0.15 mole) of p-nitroaniline, 7.8 grams of 5% palladium catalyst supported on carbon and 88.2 grams (0.90 mole) of cyclohexanone. 15 grams of cyclohexanone was placed in the water trap. The charge was gradually heated while collecting water. The first drop of water was obtained when the temperature of the reaction mixture reached 150° C. Heating was continued for about 50 minutes while the temperature gradually rose from 150 to 163° C. maximum while collecting 18.8 ml. of water. The reaction mixture was filtered hot. The filtrate crystallized immediately. The filtrate was heated in vacuo first to 140° C. at 105–130 mm. Hg and finally to 180° C. at 11 mm. Hg to remove 29.5 grams of cyclohexanone. The product, a light purple material, weighed 74.5 grams and crystallized immediately upon pouring into a Pyrex dish. It melted at 133–138° C. Vapor phase chromatographic analysis of the product for N,N'-diphenyl-p-phenylenediamine content gave 89.7%. The same product can be produced by replacing 0.15 mole of p-nitroaniline with 0.075 mole of p-aminodiphenylamine in the foregoing procedure. Another alternative is to heat 4-nitrodiphenylamine, cyclohexanone and hydrogen with palladium in an autoclave, the 4-aminodiphenylamine being formed in situ.

*Example 32*

A Parr hydrogenator was charged with 2 grams of N-tert.-butyl-p-nitroaniline in benzene solution and catalytically reduced with palladium catalyst and hydrogen to N-tert.-butyl-p-phenylenediamine. The benzene solution was then filtered to remove the catalyst, the benzene removed by distillation and the residue charged to a glass reaction vessel together with cyclohexanone and 4 grams of 5% palladium supported on carbon. The reaction mixture was then heated to remove by-product water. At 140° C. water began to separate and the charge was heated at 140–165° C. for 1½ hours, then cooled, filtered and the excess cyclohexanone removed by distillation. The residue crystallized upon cooling and was recrystallized from petroleum ether to obtain 2½ grams of N-tert.-butyl-N'-phenyl-p-phenylenediamine, M.P. 69–70° C.

*Example 33*

The glass reaction vessel was charged with 84 grams or ½ mole of p-nitrophenetole, 34.5 grams or ¼ mole of p-phenetidine, 150 grams of 3-methylcyclohexanone and 10 grams of 5% palladium catalyst supported on carbon. The reaction mixture was heated while collecting by-product water. The first drop of water separated when the reaction mixture was at about 140° C. Heating was continued for about 4 hours during which time the temperature gradually rose to 205° C. The reaction mixture was then filtered and excess 3-methylcyclohexanone removed from the filtrate by distillation. Fractionation yielded 4-ethoxy-3'-methyldiphenylamine, B.P. 184–187° C. at 2 mm. Hg pressure.

*Example 34*

Into a suitable hydrogenator was charged 14.1 grams (0.100 mole) of p-fluoronitrobenzene, 50 ml. of p-cymene and 2.0 grams of 5% palladium supported on carbon. The mixture was treated with hydrogen until 0.1 mole had been absorbed and then it was transferred to a glass reactor together with 10.8 grams (0.110 mole) of cyclohexanone and 25 ml. of p-cymene. A water trap was attached and the reaction mixture heated. Water began to collect in the trap when the temperature reached 141° C. Heating was continued at 168–186° C. for 88 minutes while collecting about 4.7 ml. of water. The reaction mixture was cooled, filtered and the flask and filter rinsed with cymene. Low boiling constituents were removed by distillation and the product isolated by collecting the fraction boiling at 168–171° C. at 16 mm. There was obtained 9.9 grams or 60% yield of p-fluorodiphenylamine which crystallized on cooling. After recrystallization from 30–60° petroleum ether product was obtained melting at 36.8–37.4° C.

*Example 35*

Phenyl-beta-naphthylamine was prepared as follows: A reaction vessel fitted with stirrer and water trap was charged with 7 grams (0.075 mole) of aniline, 3.1 grams (0.025 mole) of nitrobenzene, 12.1 grams (0.083 mole)

of beta-tetralone, 50 ml. of p-cymene and 1.5 grams of 5% palladium on carbon. The reaction charge was heated and by-product water collected. Separation of water was noticed when the temperature reached 161° C. Heating was continued for about an hour during which the temperature gradually rose to 187° C. During the reaction 2 grams of an acidic clay was added. About 2.2 ml. of water was collected. The reaction mixture was filtered at about 100° C., the recovered catalyst washed with about 15 ml. cymene. Crystalline material appeared immediately in the filtrate and washings. The combined filtrate and washings were cooled in ice, the crystalline material filtered and washed with 40 ml. of heptane. Further product was recovered from the filtrate and washings. The solution was concentrated by distilling to a pot temperature of 101° C. under 26 mm. Hg pressure. The concentrate was redissolved in hot heptane and treated repeatedly with decolorizing adjuvant which removed most of the color. The solution was then seeded, cooled in ice and filtered to obtain further product. The total yield was 11.1 grams or 67% yield of phenyl-beta-naphthylamine based on nitrobenzene. The melting point was 107.4–108° C. after recrystallizing from benzene.

*Example 36*

Preparation of p-benzoyldiphenylamine using decene as hydrogen acceptor is illustrated by the following: A reaction vessel fitted with stirrer and water trap was charged with 46 grams (0.023 mole) of 4-aminobenzophenone, 2.9 grams (0.030 mole) of cyclohexanone, 30 ml. of 1-decene, 30 ml. of p-cymene and 0.5 gram of 5% palladium on carbon. By-product water began to separate when the reaction mixture reached about 175° C. Heating was continued for approximately 4 hours at 175–179° C. after which the reaction mixture was filtered hot and the reaction vessel and filter washed with hot cymene. The filtrate and washings were cooled to room temperature, the crystals removed by filtration and washed to obtain 55% yield of p-benzoyldiphenylamine as yellow platelets, M.P. 152–154° C.

*Example 37*

Methyl-p-anilinobenzoate was produced from a mixture of methyl-p-nitrobenzoate and the corresponding amine. An hydrogenator was charged with 18.1 grams (0.10 mole) of methyl-p-benzoate, 50 ml. of p-cymene and 20 grams of 5% palladium on carbon. Nitrocompound was partially reduced with hydrogen. After about one-third of the hydrogen calculated for complete reduction to the amine had been absorbed, the reaction mixture was transferred to a reactor fitted with stirrer and water trap. There were added 10.8 grams (0.11 mole) of cyclohexanone and 20 ml. of p-cymene, the system swept with nitrogen and the reaction mixture heated and stirred while collecting by-product water. Water began to separate at 150° C. and heating was continued for two hours during which time the temperature of the reaction mixture gradually rose to 183° C. A total of 3.4 ml. of water were collected. The reaction mixture was filtered at about 140° C. The reactor and filter were rinsed with cymene and the combined filtrate and washings cooled in ice. The container was scratched to induce crystallization, solids removed by filtration and washed with cymene and petroleum ether. After recrystallizing from a mixture of ethyl alcohol and water, methyl-4-anilinobenzoate was obtained as pale tan crystals, M.P. 115.8–116.4° C. The literature reports 115.8–116.5° C.

*Example 38*

2,6-dimethyldiphenylamine was prepared as follows: An hydrogenator was charged with 15.1 grams (0.10 mole) of 1,3-dimethyl-2-nitrobenzene, 2.0 grams of 5% palladium on carbon and 50 ml. of p-cymene. About one-third of the nitrocompound was reduced by treating with hydrogen until 0.10 mole had been adsorbed. The reaction mixture was then transferred to a reactor fitted with a stirrer and water trap, to it added 10.8 grams (0.11 mole) of cyclohexanone and 15 ml. of p-cymene and heated to 155° C. at which point by-product water began to collect in the trap. Heating was continued at 155–184° C. for about 81 minutes. An additional 8.8 grams (0.09 mole) of cyclohexanone was added and heating continued at 180–183° C. for approximately another 4½ hours. The reaction mixture was transferred to a filter, the filter and flask rinsed with cymene, the filtrate and washings transferred to a separatory funnel and diluted with benzene. The benzene solution was washed with dilute sodium hydroxide solution and then several times with water. The solvents were removed by distillation under reduced pressure. The residue crystallized on standing. It was dissolved in warm petroleum ether, cooled in ice and the crystals removed by filtration and washed with a little petroleum ether. A second crop was obtained by concentrating the mother liquor. There was obtained 16.5 grams, 84% yield of 2,6-dimethyldiphenylamine, M.P. 53.6–54.6° C.

It is intended to cover all changes and modifications of the examples of the invention herein chosen for purposes of disclosure which do not constitute departures from the spirit and scope of the invention.

What is claimed is:

1. The process of aromatization which consists essentially of heating, below thermal decomposition temperature not in excess of about 300° C., six-membered alicyclic hydrocarbon monoketone free from quaternary carbon in the ring, the temperature being sufficient to dehydrogenate the alicyclic hydrocarbon radical, ammonia compound of the group consisting of ammonia, primary amines, and secondary amines and hydrogen acceptor exclusive of any cycloalkylidenamino radical dehydrogenated, said hydrogen acceptor being a compound containing at least one constituent reactive with hydrogen selected from the group consisting of a nitrogen-to-carbon double, olefinic unsaturation, and nitro with a platinum metal catalyst, thereby converting the alicyclic ketone to aromatic radical of the same number of carbon atoms replacing the hydrogen of the said ammonia compound.

2. The process of aromatization which consists essentially of heating, below thermal decomposition temperature not in excess of about 300° C., six-membered alicyclic hydrocarbon monoketone free from quaternary carbon in the ring to dehydrogenate its alicyclic hydrocarbon radical, aryl hydrocarbon primary amine of less than 19 carbon atoms containing an aromatic nucleus of not more than 10 carbon atoms attached directly to the $NH_2$ and not more than three substituents therein, and nitro compound as hydrogen acceptor with palladium catalyst, thereby converting the alicyclic ketone to aromatic radical of the same number of carbon atoms replacing hydrogen of said primary amine.

3. The process of aromatization which consists essentially of heating, below 300° C., cyclohexanone, mono-(hydrocarbonamino)phenylamine where the said hydrocarbonamino contains 1–12 carbon atoms, inclusive, and nitro compound as hydrogen acceptor with palladium catalyst, thereby converting cyclohexanone to phenyl radical replacing hydrogen of said primary amine.

4. The process of aromatization which consists essentially of heating, below thermal decomposition temperature not in excess of about 300° C., six-membered alicyclic hydrocarbon monoketone free from quaternary carbon in the ring, N-alkyl-p-phenylenediamine, and N-alkyl-p-nitroaniline wherein the said alkyls contain 1–12 carbon atoms with palladium catalyst, whereby the alicyclic ketone is converted to aromatic radical of the same number of carbon atoms replacing hydrogen of primary amine.

5. The process of aromatization which consists essentially of heating, below thermal decomposition temperature not in excess of about 300° C., N-isopropyl-p-phenylenediamine, N-isopropyl-p-nitroaniline, and cyclohexanone with palladium catalyst, the ratio of said nitrocompound being at least ⅔ mole per mole of cyclohexanone to be reacted, whereby the cyclohexanone is converted to phenyl radical replacing hydrogen of primary amine.

6. The process of making N-cyclohexyl-N'-phenyl-p-phenylenediamine which consists essentially of heating, below thermal decomposition temperature not in excess of about 300° C., N-cyclohexyl-p-phenylenediamine, N-cyclohexyl-p-nitroaniline, and cyclohexanone with palladium catalyst and isolating N-cyclohexyl-N'-phenyl-p-phenylenediamine.

7. The process of making N-cyclohexyl-N'-phenyl-p-phenylenediamine which consists essentially of heating, at 125°–200° C., one mole of N-cyclohexyl-p-phenylenediamine, two moles of N-cyclohexyl-p-nitroaniline, and three moles of cyclohexanone with palladium catalyst and isolating N-cyclohexyl-N'-phenyl - p - phenylenediamine.

8. The process of making N,N'-diphenyl-p-phenylenediamine which consists essentially of heating, below about 300° C., a mixture of about one mole of N-phenyl-p-phenylenediamine and two moles of N-phenyl-p-nitroaniline and cyclohexanone with palladium catalyst and isolating N,N'-diphenyl-p-phenylenediamine.

9. The process of making diphenylamine which consists essentially of heating, below thermal decomposition temperature not in excess of about 300° C., aniline, nitrobenzene, and cyclohexanone with palladium catalyst and isolating diphenylamine.

10. The process of making N,N'-diphenyl-p-phenylenediamine which consists essentially of heating, below thermal decomposition temperature not in excess of about 300° C., one mole of p-nitroaniline and two moles of cyclohexanone with palladium catalyst and isolating N,N'-diphenyl-p-phenylenediamine.

11. The process which consists essentially of heating, below thermal decomposition temperature not in excess of about 300° C., 4-nitrodiphenylamine, p-nitroaniline, and cyclohexanone with palladium catalyst, thereby producing N,N'-diphenyl-p-phenylenediamine as the principal product.

12. The process of making unsymmetrical diphenylamines which consists essentially of heating, below thermal decomposition temperature not in excess of 300° C., p-alkylaniline, p-alkylnitrobenzene where the said alkyls contain 1–12 carbon atoms, inclusive, and cyclohexanone with palladium catalyst, thereby producing p-alkyldiphenylamine.

13. The process of making unsymmetrical diphenylamines which consists essentially of heating, below thermal decomposition temperature not in excess of 300° C., alkoxyaniline, alkoxynitrobenzene where the said alkoxys contain 1–12 carbon atoms, inclusive, and cyclohexanone with palladium catalyst, thereby producing alkoxydiphenylamine.

14. The process of making unsymmetrical diphenylamines which consists essentially of heating, below thermal decomposition temperature not in excess of 300° C., 4-isobornyloxyaniline, cyclohexanone, and 2,6-dimethylnitrobenzene with palladium catalyst, thereby producing 4-isobornyloxydiphenylamine.

15. The process which consists essentially of heating, below thermal decomposition temperature not in excess of 300° C., nitrobenzene, aniline, and alpha-tetralone with palladium catalyst, thereby producing phenyl-alpha-naphthylamine.

16. The process which consists essentially of heating, below thermal decomposition temperature not in excess of 300° C., lower nitroalkane, alkylamine of 1–16 carbon atoms, inclusive, and cyclohexanone with palladium catalyst, thereby producing N-alkylaniline.

17. The process which consists essentially of heating, below thermal decomposition temperature not in excess of about 300° C., cyclohexylidenamine and hydrogen acceptor with palladium catalyst, whereby the cyclohexylidene radical is converted to phenyl radical.

18. The process of aromatization which consists essentially of heating, below thermal decomposition temperature not in excess of about 300° C., six-membered alicyclic hydrocarbon monoketone free from quaternary carbon in the ring, nuclear hydrocarbon-substituted aniline, said hydrocarbon containing 1–12 carbon atoms, inclusive, less than four such substituents being present and aromatic nitrocompound with palladium catalyst, thereby converting the alicyclic ketone to aromatic radical of the same number of carbon atoms replacing hydrogen of said primary amine.

19. The process of aromatization which consists essentially of heating, below thermal decomposition temperature not in excess of about 300° C., a mixture of about one mole of aryl hydrocarbon primary amine of less than 19 carbon atoms, containing an aromatic nucleus of not more than 10 carbon atoms attached directly to the $NH_2$ and not more than three substituents therein, and about two moles of the corresponding nitrocompound with cyclohexanone and palladium catalyst and isolating a product having hydrogen of the primary amine replaced by the phenyl radical.

References Cited by the Examiner
UNITED STATES PATENTS 2,413,598  12/1946  Ballard et al. ____ 260—578 XR CHARLES B. PARKER, *Primary Examiner.*

LEON ZITVER, *Examiner.*